(12) United States Patent
Li et al.

(10) Patent No.: US 7,848,896 B2
(45) Date of Patent: Dec. 7, 2010

(54) NON-CONTACT MEASUREMENT SYSTEM FOR ACCURATE MEASUREMENT OF FREQUENCY AND AMPLITUDE OF MECHANICAL VIBRATION

(75) Inventors: Changzhi Li, Gainesville, FL (US); Jenshan Lin, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 236 days.

(21) Appl. No.: 12/131,721

(22) Filed: Jun. 2, 2008

(65) Prior Publication Data

US 2008/0300805 A1  Dec. 4, 2008

Related U.S. Application Data

(60) Provisional application No. 60/941,128, filed on May 31, 2007.

(51) Int. Cl.
G01L 7/00 (2006.01)
(52) U.S. Cl. ........................................ 702/56
(58) Field of Classification Search .............. 702/54, 702/56, 150, 75, 76, 79, 159; 73/570, 657; 324/318, 633
See application file for complete search history.

(56) References Cited

U.S. PATENT DOCUMENTS

| 4,378,698 | A | * | 4/1983 | Masse et al. .................. 73/579 |
| 6,188,220 | B1 | | 2/2001 | Schaefer |
| 7,073,384 | B1 | | 7/2006 | Donskoy et al. |

FOREIGN PATENT DOCUMENTS

SU  1337875  *  9/1987
WO  WO 2008/151141  *  12/2008

OTHER PUBLICATIONS

English Abstract of SU 1337875, Sep. 1987.*
Abramov et al., English Abstract, RU 2295911, Mar. 2007.*
Xiao, Y., et al., "A Portable Noncontact Heartbeat and Respiration Monitoring System Using 5-GHz Radar," *IEEE Sensors Journal*, Jul. 2007, pp. 1042-1043, vol. 7, No. 7.
Li, C., et al., "Non-Contact Measurement of Periodic Movements by a 22-40GHz Radar Sensor Using Nonlinear Phase Modulation," *IEEE MTT-S International Microwave Symposium Digest*, Jun. 3-8, 2007, pp. 579-582.
Li, C., et al, "Optimal Carrier Frequency of Non-contact Vital Sign Detectors," 2007 *IEEE Radio and Wireless Symposium*, Jan. 9-11, 2007, pp. 281-284.

(Continued)

*Primary Examiner*—Michael P Nghiem
(74) *Attorney, Agent, or Firm*—Saliwanchik, Lloyd & Saliwanchik (57) ABSTRACT

A non-contact detection technique of measuring both the frequency and the amplitude of periodic movement using a property of nonlinear phase modulation is provided. In one embodiment, the technique can utilize a 22-40 GHz radar sensor. Embodiments do not require calibration of signal amplitude for accurate measurement of movement amplitude. In addition, self-verification is possible. Furthermore, embodiments can provide measurements of frequency and amplitude using a very simple architecture. The method can be used to detect movements with amplitudes larger than 0.335 of the carrier wavelength for a fixed carrier frequency system and 0.214 of the minimum carrier wavelength for a frequency tunable system.

47 Claims, 4 Drawing Sheets

OTHER PUBLICATIONS

Li, C., et al., "Experiment and Spectral Analysis of a Low-Power Ka-Band Heartbeat Detector Measuring From Four Sides of a Human Body," *IEEE Transactions on Microwave Theory and Techniques*, Dec. 2006, pp. 4464-4471, vol. 54, No. 12.

Li, C., et al., "Robust Overnight Monitoring of Human Vital Signs by a Non-contact Respiration and Heartbeat Detector," 28th *IEEE EMBS Annual International Conference*, Aug. 30-Sep. 3, 2006, pp. 2235-2238, New York City, US.

Xiao, Y., et al., "Frequency-Tuning Technique for Remote Detection of Heartbeat and Respiration Using Low-Power Double-Sideband Transmission in the Ka-Band," *IEEE Transactions on Microwave Theory and Techniques*, May 2006, pp. 2023-2032, vol. 54, No. 5.

Xiao, Y., et al., "A Ka-Band Low Power Doppler Radar System for Remote Detection of Cardiopulmonary Motion," 2005 *IEEE Engineering in Medicine and Biology 27th Annual Conference*, Sep. 1-4 2005, pp. 7151-7154, Shanghai, China.

Stezer, A. et al., "Microwave position sensor with sub millimeter accuracy," *IEEE Trans. Microwave Theory and Techniques*, vol. 47, No. 12, pp. 2621-2624, Dec. 1999.

Ivanov, E. N., et al., "Microwave interferometry: Application to precision measurements and noise reduction techniques," *IEEE Trans. Ultrason., Ferroelect, Freq. Contr.*, vol. 45, No. 6, pp. 1526-1536, Nov. 1998.

Kim, S., et at, "On the development of a multifunction millimeter-wave sensor for displacement sensing and low-velocity measurement", *IEEE Trans. Microwave Theory and Techniques*, vol. 52, No. 11, pp. 2503-2512, Nov. 2004.

Droitcour, A.D., et al., "Range correlation and I/Q performance benefits in single-chip silicon Doppler radars for noncontact cardiopulmonary monitoring", *IEEE Trans. Microwave Theory and Techniques*, vol. 52, No. 3, pp. 838-848, Mar. 2004.

\* cited by examiner

NON-CONTACT MEASUREMENT SYSTEM FOR ACCURATE MEASUREMENT OF FREQUENCY AND AMPLITUDE OF MECHANICAL VIBRATION

CROSS-REFERENCE TO RELATED APPLICATION

The present application claims the benefit of U.S. Application Ser. No. 60/941,128, filed May 31, 2007, which is hereby incorporated by reference herein in its entirety, including any figures, tables, or drawings.

BACKGROUND OF INVENTION

Microwave and millimeter-wave technologies have been widely used for position sensing, such as described in Stezer et al., "Microwave position sensor with sub millimeter accuracy," IEEE Trans. Microwave Theory and Techniques, vol. 47, pp. 2621-2624, December 1999. Microwave and millimeter techniques have also been used for precision noise measurement, such as described in Ivanov et al., "Microwave interferometry: Application to precision measurements and noise reduction techniques," IEEE Trans. Ultrason., Ferroelect., Freq. Contr., vol. 45, pp. 1526-1536, November 1998. Likewise, microwave and millimeter-wave methods have been applied to displacement measurement, such as described in Kim et al., "On the development of a multifunction millimeter-wave sensor for displacement sensing and low-velocity measurement," IEEE Trans. Microwave Theory and Techniques, vol. 52, pp 2503-2512, November 2004.

In addition, microwave and millimeter technologies have been applied to cardio pulmonary sensing, such as described in Droitcour et al., "Range correlation and I/Q performance benefits in single-chip silicon Doppler radars for noncontact cardiopulmonary monitoring," IEEE Trans. Microwave Theory and Techniques, vol. 52, pp. 838-848, March 2004. The mechanism of most of the microwave displacement-related measurement systems is the detection of the phase shift caused by the movement of the target. Based on this, a Doppler radar has been developed to monitor periodic vital sign movements, and a linear approximation was used to analyze the performance as shown by Droitcour et al. However, the system could only detect the frequency of movement, not the amplitude.

Accordingly, there is a need for a method and apparatus for accurate non-contact measurement of frequency and amplitude of mechanical vibration.

BRIEF SUMMARY

Embodiments of the invention pertain to a mechanical vibration detection method and system based on the measurement of the nonlinear effect inherent in a phase modulation mechanism. Embodiments of the invention relate to a simple non-contact detection technique of determining the frequency and/or the amplitude of periodic displacement using nonlinear phase modulation. Specific embodiments do not utilize calibration of signal amplitude. Even without calibration of signal amplitude, embodiments of the invention are able to obtain an accurate measurement of movement amplitude. Specific embodiments are capable of self-verification of measurement accuracy. In addition, in specific embodiments, the radio architecture can be very simple. Since the method is based on nonlinear phase modulation, the method can measure a very large range of movement amplitude. The analysis of the wide angle incidence due to large target aperture shows the method has high measurement accuracy in practical applications.

BRIEF DESCRIPTION OF DRAWINGS

FIGS. 2A and 2B show a theoretical harmonic ratio as a function of the movement amplitude, where the movement amplitude m is normalized to the carrier wavelength λ, and the grid line indicates the harmonic ratio of 0.2 and 5, where FIG. 2A shows a H3/H1 ratio and H4/H2 ratio, and FIG. 2B shows a H5/H3 ratio and a H6/H4 ratio.

FIGS. 6A-6D show a radiation pattern of the horn antenna used in an experiment and a 10×10 antenna array, where

DETAILED DISCLOSURE

Embodiments of the invention pertain to a mechanical vibration detection method and system based on the measurement of the nonlinear effect inherent in a phase modulation mechanism. By identifying different orders of harmonics caused by the nonlinear property of phase modulation, the frequency of the periodic movement can be measured. In addition, identification of different orders of harmonics caused by the non-linear property of phase modulation can also be used to measure the amplitude of the periodic movement. Embodiments of the subject method do not require calibration of signal amplitude. In addition, embodiments of the invention can utilize self-verification to ensure accurate measurement. Embodiments of the subject method can have a large detection range of movement frequency and amplitude. In further embodiments, a simple hardware architecture can be utilized to perform specific embodiments of the subject method.

Embodiments of the present invention take into account the near field and wide angle incidence effects by providing proper choice of antenna radiation pattern and measurement distance for precision measurement. An embodiment provides guidelines for the design of measurement systems used for actuator calibration and Doppler radar vital sign monitoring.

Figure 1:
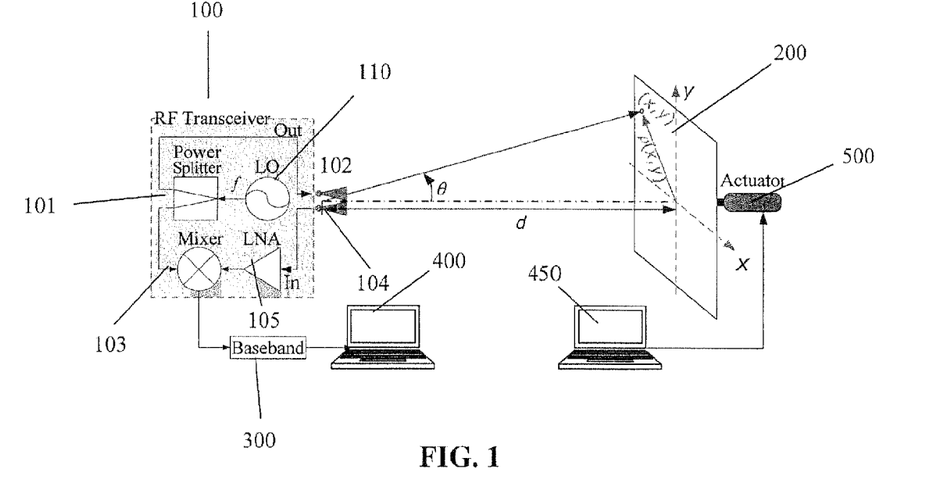
FIG. 1 shows a block diagram and experimental setup in accordance with an embodiment of the subject invention.

Embodiments can incorporate system architectures similar to those previously used to monitor periodic movements and can be operated under different modulation conditions. A portion of FIG. 1 shows a block diagram of a system architecture according to an embodiment of the present invention. The actuator shown in FIG. 1 can be used in an experimental setup used in the examples described below. In particular, the embodiment provided in a portion of FIG. 1 can include an RF transceiver 100 including an oscillator 110, power splitter 101, mixer 103, and low noise amplifier 105; a baseband circuit 300; and a signal processor 400 shown here as a laptop. FIG. 1 also shows an actuator 500 and an actuator controller 450 that can be used in an experimental setup, which interacts with a target 200 controlled by the precision linear actuator 500 to produce desired periodic movements.

Referring to specific embodiments shown in a portion of FIG. 1, the RF transceiver 100 can operate from 22 GHz to 40 GHz. In another specific embodiment, the RF transmitter and RF receiver, or RF transceiver, can operate at or about 9 GHz. A 3-dB power splitter 101 can be used to divide the generated signal into two, with half of the power sent to the transmitting antenna 102 and half of the power sent to the receiver mixer 103 as the reference. When the transmitted signal reaches the target 200, it is reflected and captured by the receiving antenna 104. After passing through a low noise amplifier 105, the signal can be down-converted to baseband by the mixer 103 and further amplified by the baseband circuit 300 before it is digitized and fed into the laptop 400 for real time signal processing. Although a laptop 400 is shown as performing the signal processing, other devices can be used so long as the devices have the capability of performing the signal processing. In an experiment testing the performance of the system, the target 200 is controlled by a precision linear actuator 500 through another laptop 450 to produce the desired periodic movements.

As shown in Li et al., "Experiment and Spectral Analysis of a Low-Power Ka-Band Heartbeat Detector Measuring from Four Sides of a Human Body", IEEE Trans. Microwave Theory and Techniques, vol. 54, no. 12, December 2006, which is hereby incorporated by reference in its entirety, for ideal Doppler radar sensing of physical movements, the normalized detected baseband signal is:

$$B(t) = \cos\left[\theta + \frac{4\pi x(t)}{\lambda} + \Delta\phi(t)\right] \quad (1)$$

where $\theta$ is the constant phase shift created on the transmission path and at the surface of the target, $\Delta\phi(t)$ is the total residual phase noise, $\lambda$ is the carrier wavelength, and $x(t)$ is the time varying displacement of the target. For a single tone periodic movement, $x(t) = m \sin \omega t$; for a more complex movement, it can be decomposed into a series of single tone movements.

When the movement amplitude m is much smaller than the wavelength $\lambda$, a linear approximation can be applied as described in Droitcour et al.

However, when a small wavelength is used such that $x(t)$ is comparable to $\lambda$, a rigorous spectral analysis as described in Li et al. should be applied, and the received signal can be expanded as:

$$B(t) = 2 \cdot \sum_{k=1}^{\infty} J_{2k}\left(\frac{4\pi m}{\lambda}\right) \cdot \cos 2k\omega t \cdot \cos\phi - \quad (2)$$

$$2 \cdot \sum_{k=0}^{\infty} J_{2k+1}\left(\frac{4\pi m}{\lambda}\right) \cdot \sin(2k+1)\omega t \cdot \sin\phi$$

where $\phi = \theta + \Delta\phi(t)$ is the total residual phase, and $J_n(x)$ is the nth order Bessel function of the first kind. Therefore, the phase-modulated baseband signal can be decomposed into a number of harmonics of the fundamental frequency.

While the movement frequency $\omega$ is readily obtained from the fundamental frequency of $B(t)$, equation (2) also shows that for a certain carrier frequency, the relative strength among the harmonics is decided by the movement amplitude m and the residual phase $\phi$, and is not a function of signal level determined by receiver gain and measurement distance. For example, the absolute value of ratio among the $1^{st}$, $2^{nd}$, $3^{rd}$, and $4^{th}$ order harmonics is:

$$H_1 : H_2 : H_3 : H_4 = \quad (3)$$

$$\left|J_1\left(\frac{4\pi m}{\lambda}\right)\cos\phi\right| : \left|J_2\left(\frac{4\pi m}{\lambda}\right)\sin\phi\right| : \left|J_3\left(\frac{4\pi m}{\lambda}\right)\cos\phi\right| : \left|J_4\left(\frac{4\pi m}{\lambda}\right)\sin\phi\right|.$$

When the movement frequency w varies with time, specific embodiments of the invention can adapt by, for example, varying $\lambda$.

Moreover, if separating the harmonics into groups of even order and odd order, the ratio inside each group is only decided by m. Therefore, m can be found by fitting the measured harmonic ratio to the theoretical value from Bessel function, which can be performed for either odd order or even order harmonics.

According to an embodiment of the present invention, the amplitude of the movement can be accurately determined in remote non-contact measurement without calibrating the signal level vs. distance, provided that the wavelength is accurately determined. In contrast, when using a linear modulation method, the signal level which is affected by the receiver gain and the distance to the target would need to be calibrated to determine the movement amplitude.

In an embodiment, either, or both, of the even order and the odd order harmonic ratios can be used to extract the amplitude of movement. The harmonic ratio can be $H_{n+2}/H_n$ or $H_n/H_{n+2}$, or some function of the ratio, where $H_{n+2}$ is the n+2 order harmonic, and $H_n$ is the n order harmonic.

Figure 2A:
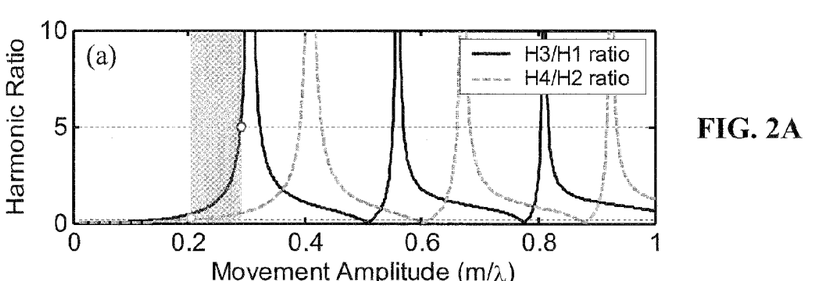
Figure 2B:
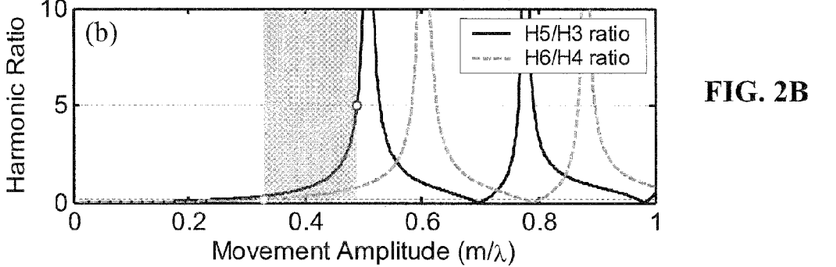

When both the even order and the odd order harmonic ratios are used, there can be more than a single result for the same measurement. The accuracy of the measurement can thus be verified by checking whether the two results agree with each other. Therefore, according to embodiments of the present invention, a pair of harmonic ratios (e.g., an even order ratio and an odd order ratio) can be used simultaneously for a single measurement. For example, FIGS. 2A-2B show up to the $6^{th}$-to-$4^{th}$ harmonic ratio as a function of normalized movement amplitude. The plots show that when the displacement is too small compared with the wavelength, the harmonics are too weak to be observed, corresponding to the linear approximation region described in Droitcour et al. As the displacement increases, harmonics become observable, making embodiments of the subject measurement method useful.

However, it should be noted that there are multi-solutions of movement amplitude because of the non-linear property, and it can be impractical to accurately measure either too small or too large a harmonic ratio. Therefore, in an embodiment, a detection range can be defined for a pair of harmonic ratios as the lowest range of movement amplitude that induces the measurable harmonic ratio. In a specific embodiment, this detection range can be from about 0.2 to about 5. For example, in FIG. 2A, a detection range of the $3^{rd}$-to-$1^{st}$ (H3/H1) and the $4^{th}$-to-$2^{nd}$ (H4/H2) harmonic ratio pair from about $0.214\lambda$ to about $0.290\lambda$ is shown, which correspond to 0.2 for H4/H2 and 5 for H3/H1, respectively. Similarly, a detection range of the $5^{th}$-to-$3^{rd}$ (H5/H3) and the $6^{th}$-to-$4^{th}$ (H6/H4) harmonic ratio pair in FIG. 2B from about $0.335\lambda$ to about $0.489\lambda$. Based on the observation above, in an embodiment, the applicable detection range, normalized to $\lambda$, for different harmonic pairs is provided in Table I. The H-Pair with index "i" means the $(i+2)^{th}$-to-$i^{th}$ and the $(i+3)^{th}$-to-$(i+1)^{th}$ harmonic ratio pair.

TABLE I

DETECTION RANGE FOR DIFFERENT PAIRS OF HAMONICS

| H-Pair | i = 1 | i = 2 | i = 3 | i = 4 | i = 5 |
|---|---|---|---|---|---|
| Lower Bound | 0.214 | 0.335 | 0.455 | 0.575 | 0.694 |
| Upper Bound | 0.290 | 0.489 | 0.677 | 0.859 | 1.039 |
| H-Pair | i = 6 | i = 7 | i = 8 | i = 9 | i = 10 |
| Lower Bound | 0.813 | 0.932 | 1.051 | 1.170 | 1.288 |
| Upper Bound | 1.216 | 1.391 | 1.565 | 1.737 | 1.909 |

It is shown in Table I that, except for a small gap between the i=1 pair and the i=2 pair, the nonlinear detection method according to an embodiment of the present invention can detect any movement amplitude that is larger than $0.214\lambda$. By tuning the frequency for about 10% to change the wavelength, the small gap between the i=1 pair and the i=2 pair can also be covered. Therefore, in a specific embodiment, the measurement range of the system can be any movement amplitude larger than $0.335\lambda$ for a fixed carrier frequency system and larger than $0.214\lambda_{min}$ for a frequency tunable system, where $\lambda_{min}$ is the minimum carrier wavelength.

Figure 3A:
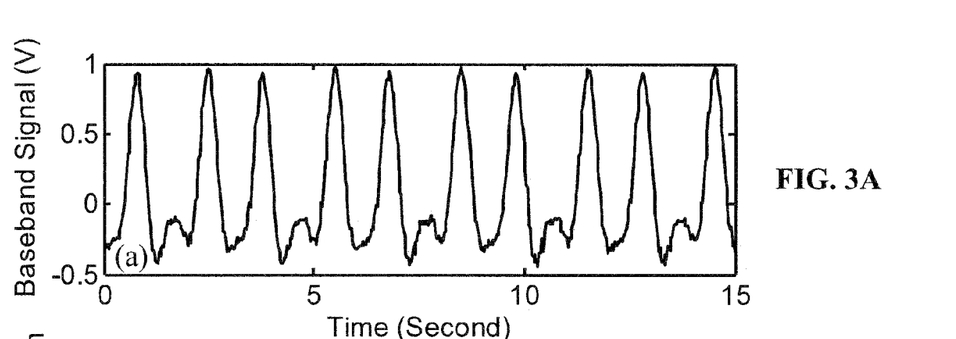
FIGS. 3A and 3B show a detected baseband signal (FIG. 3A) and spectrum (FIG. 3B) when carrier frequency is 40 GHz.
Figure 3B:
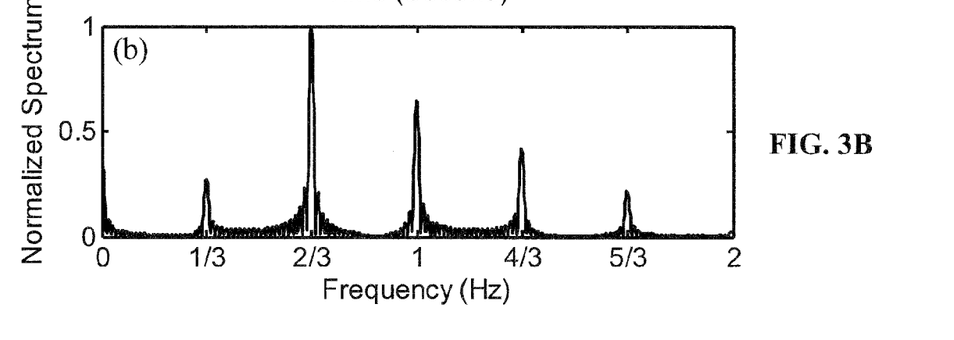

An example of a measured baseband signal and spectrum, using the system shown in FIG. 1, is illustrated in FIGS. 3A and 3B, respectively. For the system set-up used to provide the measured baseband signal and spectrum, the carrier frequency is 40 GHz, and the transmitted power is 50 µW. The target 200 is located 1.65 m away from the antenna. Referring to FIG. 3B, up to the $5^{th}$ order harmonic of movement is clearly discernible in the detected spectrum.

Figure 4:
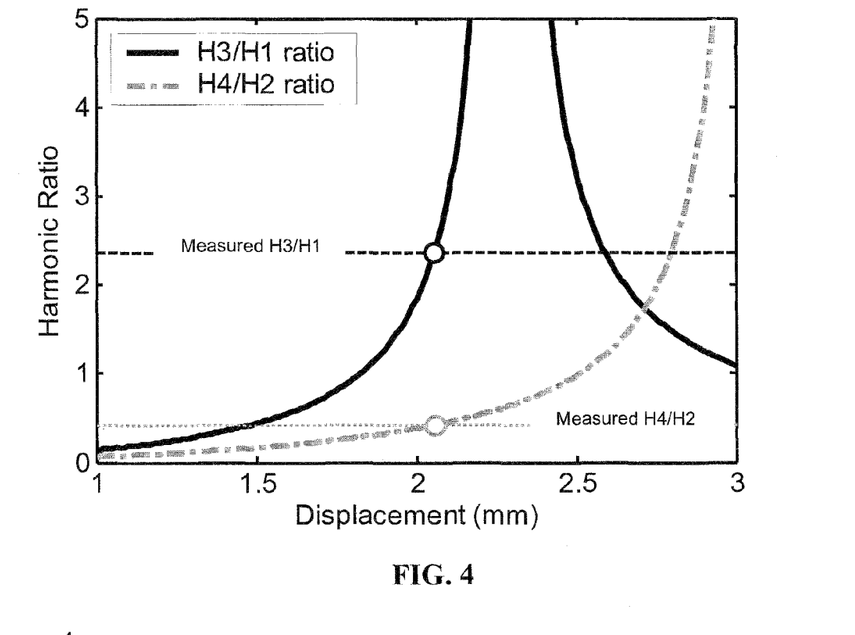
FIG. 4 shows harmonic ratio versus displacement, which can be used in a method to obtain the displacement and to check the validity of the measurement.

It can be observed from the spectrum that the period of the movement is 3 seconds. Given the carrier frequency f=40 GHz, the theoretical harmonic ratios based on equation (3) can be calculated. FIG. 4 shows the $3^{rd}$-to-$1^{st}$ and the $4^{th}$-to-$2^{nd}$ harmonic ratios as the movement amplitude (displacement) changes. From the spectrum of FIG. 3B, the measured $3^{rd}$-to-$1^{st}$ and $4^{th}$-to-$2^{nd}$ harmonic ratios are 2.3613 and 0.414, corresponding to the movement amplitude of 2.056 mm and 2.045 mm respectively. The measurement result agrees well with the programmed movement amplitude of 2 mm for the actuator 500. This example shows that the non-linear phase modulation method according to embodiments of the present invention can provide accurate result with a simple radio architecture.

In real applications, an antenna has finite directivity when radiating out a signal. The signal will thus reach different parts of the target. Relative to the antenna's position, the different parts of the target have different movement direction and speed. Theoretically, suppose the antenna main beam is aligned to the center of target, then the received signal from location (x, y) on the target can be expressed as:

$$B(t, x, y) = I(x, y) \cdot \cos\left(\frac{4\pi\sqrt{(m\sin(\omega t) + d_0)^2 + \rho(x, y)^2}}{\lambda} + \Delta\phi_0\right) \quad (4)$$

where I(x, y) is the reflected electromagnetic intensity, $d_0$ is the horizontal distance from the antenna to the target, and $\rho(x, y)$ is the vertical distance from that location to the center of the target, as shown in FIG. 1. The total received signal is the integral of B(t, x, y) over the whole target surface:

$$B(t) = \iint_s B(t,x,y) ds \quad (5)$$

Figure 5A:
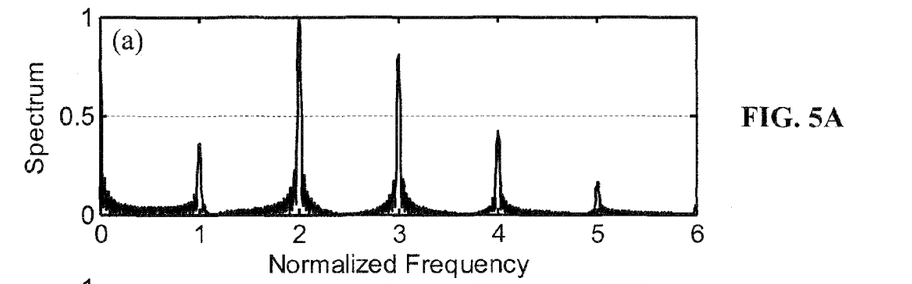
FIGS. 5A and 5B show a baseband spectrum induced from the center (FIG. 5A) and the corner (FIG. 5B) of the target, which is placed 0.25 m in front of the antenna.
Figure 5B:
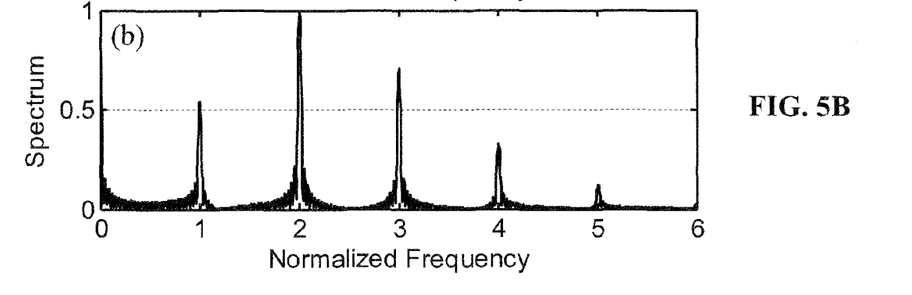

Since I(x, y) is dependent on the antenna, the cosine term of equation (4) can be first considered. Due to a wide angle incidence, different parts of the target induce a different baseband spectrum. For example, FIGS. 5A-5B compare the simulated baseband spectrum induced from the center and the corner of the target 200, which in this experiment is a 14 cm by 14 cm square placed at 0.25 m in front of the antenna.

From this point of view, when signals with different baseband spectrum are added together, it may badly deteriorate the measurement accuracy. Fortunately, the impact of I(x, y) can help resolve this problem. Intuitively, if the antenna beam is as narrow as a line, the detected signal contains only the information from the center of the target and thus produces ideal measurement result. Therefore, a directional antenna can be viewed as a filter that blocks the unwanted signal from the edge of the target. Embodiments of the subject invention can incorporate a directional antenna or other hardware or equipment to effect measurement of signal from a narrow section of the target.

Figure 6:
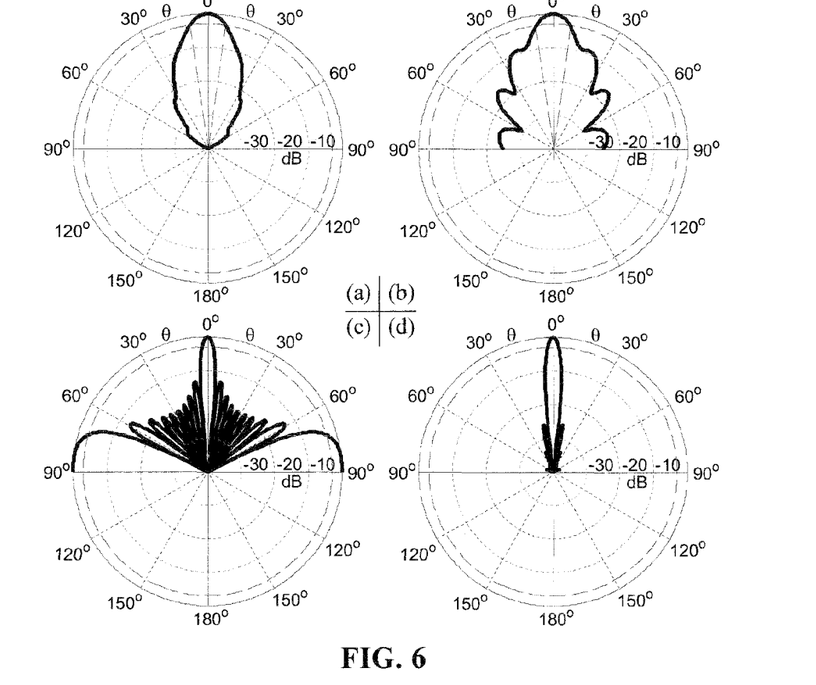
FIG. 6A shows an H-plane of the horn.
FIG. 6B shows an E-plane of the horn.
FIG. 6C shows F=0° plane of the array.
FIG. 6D shows F=45° plane of the array.

To qualitatively illustrate this effect, three types of antennas are considered: the omnidirectional antenna, the horn antenna used in the experiment, and a 10 by 10 array of omnidirectional antennas. FIGS. 6A-6D show the radiation pattern of the horn and the antenna array, where FIG. 6A shows an H-plane of the horn, FIG. 6B shows an E-plane of the horn, FIG. 6C shows F=0° plane of the array, and FIG. 6D shows F=45° plane of the array.

Figure 7A:
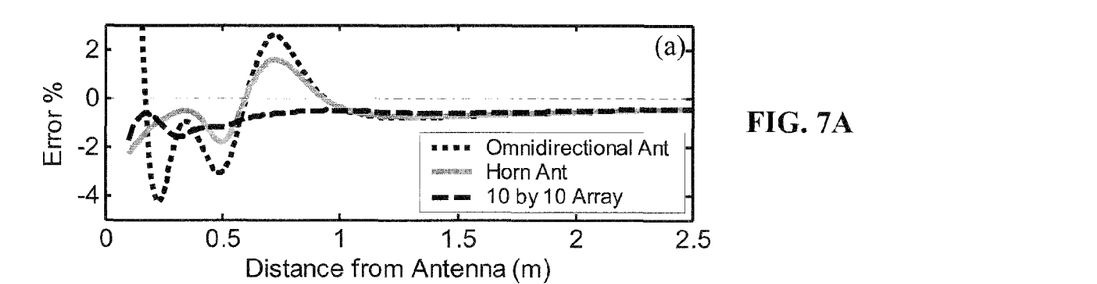
FIGS. 7A and 7B show measurement error of $3^{rd}$ order to $1^{st}$ order ratio (FIG. 7A) and $4^{th}$ order to $2^{nd}$ order ratio (FIG. 7B) by different antennas.
Figure 7B:
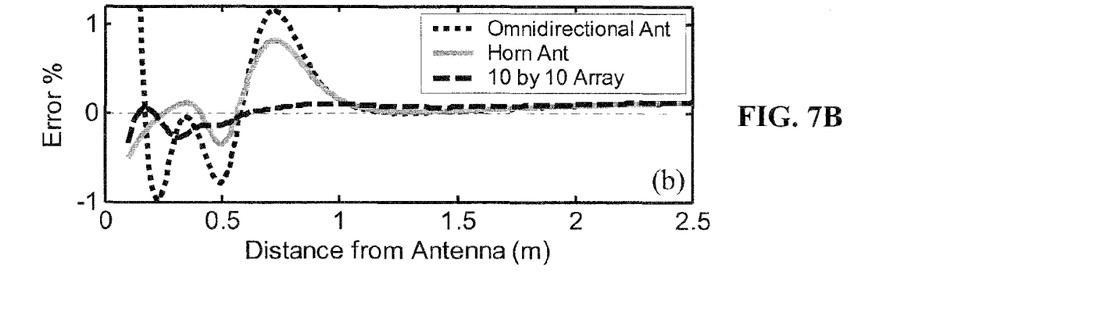

Numerical simulation was performed to get spectrum of the total received baseband signal B(t) in equation (5). The detection error was obtained by comparing the received spectrum with the spectrum induced from the center of the target, which is the ideal case using the antenna with infinite directivity. The error is defined as the deviation in the $3^{rd}$-to-$1^{st}$ and $4^{th}$-to-$2^{nd}$ harmonic ratios compared with those in ideal case. The result is presented in FIG. 7.

From the result, it can be seen that in an embodiment, the measurement error is less than 5 percent for each case. The error gets smaller as the radiation pattern gets more focused. The error also has a tendency to reduce as the distance increases, although a fluctuation is observed. The fluctuation, especially when the distance is relatively small, is caused by the near field effect. To be more specific, the difference in the distance from different parts of the target to the antenna leads to the difference in residual phase, causing out-of-phase signals canceling each other. When most of the undesired signals, i.e., signal produced far from the center of the target, cancel each other, the error is small; otherwise the error becomes large.

The above analysis shows that the wide angle incidence due to large target aperture does not cause significant degradation of measurement accuracy.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCES

[1] A. Stezer, C. G. Diskus, K. Lubke, and H. W. Thim, "Microwave position sensor with sub millimeter accuracy," *IEEE Trans. Microwave Theory and Techniques*, vol. 47, pp. 2621-2624, December 1999.
[2] E. N. Ivanov, M. E. Tobar, and R. A. Woode, "Microwave interferometry: Application to precision measurements and noise reduction techniques," *IEEE Trans. Ultrason., Ferroelect., Freq. Contr.*, vol. 45, pp. 1526-1536, November 1998.
[3] S. Kim, and Cam Nguyen, "On the development of a multifunction millimeter-wave sensor for displacement sensing and low-velocity measurement", *IEEE Trans. Microwave Theory and Techniques*, vol. 52, pp. 2503-2512, November 2004.
[4] A. D. Droitcour, O. Boric-Lubecke, V. M. Lubecke, J. Lin, and G. T. A. Kovac, "Range correlation and I/Q performance benefits in single-chip silicon Doppler radars for noncontact cardiopulmonary monitoring", *IEEE Trans. Microwave Theory and Techniques*, vol. 52, pp. 838-848, March 2004.
[5] C. Li, Y. Xiao, and J. Lin, "Experiment and Spectral Analysis of a Low-Power Ka-Band Heartbeat Detector Measuring from Four Sides of a Human Body", *IEEE Trans. Microwave Theory and Techniques*, vol. 54, no. 12, December 2006.

What is claimed is:

1. A method for non-contact measurement of a periodic movement of a target, comprising:
    transmitting a radio frequency (RF) signal towards the target, wherein upon incidence of the radio frequency (RF) signal on the target a reflected radio frequency (RF) signal is produced;
    receiving the reflected radio frequency (RF) signal;
    down-converting the received radio frequency (RF) signal to a baseband signal;
    determining one harmonic of the baseband signal having an order n, where n is an integer; and
    determining an additional harmonic of the baseband signal having an order n+2;
    determining a model, wherein the model comprises a model ratio of the n+2 order harmonic and the n order harmonic as a function of model movement amplitude;
    determining an amplitude of a periodic movement of the target from the n+2 order harmonic of the baseband signal and the n order harmonic of the baseband signal, wherein determining the amplitude of the periodic movement of the target comprises:
        calculating a measured ratio, wherein the measured ratio is a ratio of the n+2 order harmonic of the baseband signal and the n order harmonic of the baseband signal; and
        determining the amplitude of the periodic movement by comparing the measured ratio to the model and selecting the model movement amplitude corresponding to the measured ratio, wherein the amplitude of the periodic movement of the target is the selected model movement amplitude corresponding to the measured ratio.

2. The method according to claim 1, wherein the frequency of the radio frequency (RF) signal is 9 GHz or higher.

3. The method according to claim 1, wherein the frequency of the radio frequency (RF) signal is between 22 GHz and 40 GHz.

4. The method according to claim 1, wherein the target is a human or animal, wherein the periodic movement is due to the target's breathing movement.

5. The method according to claim 1, wherein the target is a human or animal, wherein the periodic movement is due to the target's heart movement.

6. The method according to claim 1, further comprising:
    determining a frequency of the periodic movement of the target.

7. The method according to claim 6, wherein the target is a human or animal, wherein the periodic movement is due to the target's breathing movement, wherein the frequency of the period movement of the target is the target's breathing rate.

8. The method according to claim 6, wherein the target is a human or an animal, wherein the periodic movement is due to the target's heart movement, wherein the frequency of the period movement of the target is the target's heart rate.

9. The method according to claim 1, wherein the model is based on a non-linear Doppler phase modulation effect in the reflected radio frequency (RF) signal.

10. The method according to claim 1, wherein the radio frequency (RF) signal is a single tone radio frequency (RF) signal.

11. The method according to claim 10, wherein the radio frequency (RF) signal has no modulation.

12. The method according to claim 10, wherein the periodic movement of the target is sinusoidal.

13. The method according to claim 10, wherein the periodic movement of the target is a series of sinusoids.

14. The method according to claim 1, wherein the model is determined theoretically.

15. The method according to claim 1, wherein the model is determined experimentally.

16. The method according to claim 1, wherein the ratio of the n+2 order harmonic and the n order harmonic in the model is $H_{n+2}/H_n$, wherein the ratio of the n+2 order harmonic and the n order harmonic in the measured ratio is $H_{n+2}/H_n$.

17. The method according to claim 1, wherein the ratio of the n+2 order harmonic and the n order harmonic in the model is $H_n/H_{n+2}$, wherein the ratio of the n+2 order harmonic and the n order harmonic in the measured ratio is $H_n/H_{n+2}$.

18. The method according to claim 1, wherein the model is dependent on the wavelength of the radio frequency (RF) signal.

19. The method according to claim 1, wherein n is odd.

20. The method according to claim 1, wherein n is even.

21. The method according to claim 1, wherein $m \geq 0.214\lambda$, where m is the amplitude of the periodic movement of the target, where $\lambda$ is the wavelength of the radio frequency (RF) signal.

22. The method according to claim 21, wherein n=1, wherein $0.214\lambda \leq m \leq 0.290\lambda$.

23. The method according to claim 21, wherein n=2, wherein $0.335\lambda \leq m \leq 0.489\lambda$.

24. The method according to claim 21, wherein n=3, wherein $0.455\lambda \leq m \leq 0.677\lambda$.

25. The method according to claim 21, wherein n=4, wherein $0.575\lambda \leq m \leq 0.859\lambda$.

26. The method according to claim 21, wherein n=5, wherein $0.694\lambda \leq m \leq 1.039\lambda$.

27. A system for non-contact measurement of a periodic movement of a target, comprising:

a means for transmitting a radio frequency (RF) signal towards the target, wherein upon incidence of the radio frequency (RF) signal on the target a reflected radio frequency (RF) signal is produced;

a means for receiving the reflected radio frequency (RF) signal from the target;

a means for down-converting the received radio frequency (RF) signal to a baseband signal;

a means for determining one harmonic of the baseband signal having an order n, where n is an integer; and a means for determining an additional harmonic of the baseband signal having an order n+2;

a means for determining an amplitude of a periodic movement of the target from the n+2 order harmonic of the baseband signal and the n order harmonic of the baseband signal, wherein the means for determining the amplitude of the periodic movement of the target comprises:

a means for calculating a measured ratio, wherein the measured ratio is a ratio of the n+2 order harmonic of the baseband signal and the n order harmonic of the baseband signal; and a means for determining the amplitude of the periodic movement by comparing the measured ratio to a model, wherein the model comprises a model ratio of the n+2 order harmonic and the n order harmonic as a function of model movement amplitude, and selecting the model movement amplitude corresponding to the measured ratio, wherein the amplitude of the periodic movement of the target is the selected model movement amplitude corresponding to the measured ratio.

28. A system for non-contact measurement of a periodic movement of a target, comprising:

a radio frequency (RF) transmitter, wherein the radio frequency (RF) transmitter is adapted to transmit a radio frequency (RF) signal towards the target, wherein upon incidence of the radio frequency (RF) signal on the target a reflected radio frequency (RF) signal is produced;

a radio frequency (RF) receiver, wherein the radio frequency (RF) receiver is adapted for receiving the reflected radio frequency (RF) signal from the target;

a mixer, wherein the mixer down-converts the received radio frequency (RF) signal to a baseband signal; and a signal processing device, wherein the signal processing device:

determines one harmonic of the baseband signal having an order n, where n is an integer;

determines an additional harmonic of the baseband signal having an order n+2;

determines an amplitude of a periodic movement of the target from the n+2 order harmonic of the baseband signal and the n order harmonic of the baseband signal, wherein determining the amplitude of the periodic movement of the target comprises:

calculating a measured ratio, wherein the measured ratio is a ratio of the n+2 order harmonic of the baseband signal and the n order harmonic of the baseband signal; and determining the amplitude of the periodic movement by comparing the measured ratio to a model, wherein the model comprises a model ratio of the n+2 order harmonic and the n order harmonic as a function of model movement amplitude, and selecting the model movement amplitude corresponding to the measured ratio, wherein the amplitude of the periodic movement of the target is the selected model movement amplitude corresponding to the measured ratio.

29. The system according to claim 28, wherein the radio frequency (RF) signal is a single tone radio frequency (RF) signal.

30. The system according to claim 28, wherein the ratio of the n+2 order harmonic and the n order harmonic in the model is $H_{n+2}/H_n$, wherein the ratio of the n+2 order harmonic and the n order harmonic in the measured ratio is $H_{n+2}/H_n$.

31. The system according to claim 28, wherein the ratio of the n+2 order harmonic and the n order harmonic in the model is $H_n/H_{n+2}$, wherein the ratio of the n+2 order harmonic and the n order harmonic in the measured ratio is $H_n/H_{n+2}$.

32. The system according to claim 28, wherein the model is dependent on the wavelength of the radio frequency (RF) signal.

33. The system according to claim 28, wherein the frequency of the radio frequency (RF) signal is 9 GHz or higher.

34. The system according to claim 28, wherein the frequency of the radio frequency (RF) signal is between 22 GHz and 40 GHz.

35. The system according to claim 28, wherein the signal processing device determines a frequency of the periodic movement of the target.

36. The system according to claim 28, wherein the model is based on a non-linear Doppler phase modulation effect in the reflected radio frequency (RF) signal.

37. The system according to claim 28, wherein the radio frequency (RF) signal has no modulation.

38. The system according to claim 28, wherein the model is determined theoretically.

39. The system according to claim 28, wherein the model is determined experimentally.

40. The system according to claim 28, wherein n is odd.

41. The system according to claim 28, wherein n is even.

42. The system according to claim 28, wherein $m \geq 0.214\lambda$, where m is the amplitude of the periodic movement of the target, where $\lambda$ is the wavelength of the radio frequency (RF) signal.

43. The system according to claim 28, wherein n=1, wherein $0.214\lambda \leq m \leq 0.290\lambda$.

44. The system according to claim 28, wherein n=2, wherein $0.335\lambda \leq m \leq 0.489\lambda$.

45. The system according to claim 28, wherein n=3, wherein $0.455\lambda \leq m \leq 0.677\lambda$.

46. The system according to claim 28, wherein n=4, wherein $0.575\lambda \leq m \leq 0.859\lambda$.

47. The system according to claim 28, wherein n=5, wherein $0.694\lambda \leq m \leq 1.039\lambda$.

* * * * *

UNITED STATES PATENT AND TRADEMARK OFFICE
CERTIFICATE OF CORRECTION

PATENT NO. : 7,848,896 B2
APPLICATION NO. : 12/131721
DATED : December 7, 2010
INVENTOR(S) : Changzhi Li and Jenshan Lin It is certified that error appears in the above-identified patent and that said Letters Patent is hereby corrected as shown below:

Column 1,
Line 33, "cardio pulmonary" should read --cardiopulmonary--.

Column 3,
Line 44, "x(t)=m sin ωt" should read --x(t)=$m$sinωt--.

Column 5,
Line 29, "0.335λ" should read --0.335 λ--.
Line 30, "0.214λ$_{min}$" should read --0.214 λ$_{min}$--.
Line 36, "50 μW" should read --50μW--.
Line 53, "accurate result" should read --accurate results--.
Line 60, "center of target" should read --center of the target--.
Line 65, "$B(t, x, y) = I(x, y) \cdot \cos$" should read --$B(t, x, y) = l(x, y) \cdot \cos$--.

Column 8,
Line 51, "m≧0.214λ" should read --m ≥ 0.214 λ--.
Line 56, "0.214λ≦m≦0.290λ" should read --0.214 λ ≤ m ≤ 0.290 λ--.
Line 58, "0.335λ≦m≦0.489λ" should read --0.335 λ ≤ m ≤ 0.489 λ--.
Line 60, "0.455λ≦m≦0.677λ" should read --0.455 λ ≤ m ≤ 0.677 λ--.
Line 62, "0.575λ≦m≦0.859λ" should read --0.575 λ ≤ m ≤ 0.859 λ--
Line 64, "0.694λ≦m≦1.039λ" should read --0.694 λ ≤ m ≤ 1.039 λ--.

Column 10,
Line 44, "m≧0.214λ" should read --m ≥ 0.214 λ--.
Line 49, "0.214λ≦m≦0.290λ" should read --0.214 λ ≤ m ≤ 0.290 λ--.
Line 51, "0.335λ≦m≦0.489λ" should read --0.335 λ ≤ m ≤ 0.489 λ--.

Signed and Sealed this
Twenty-ninth Day of March, 2011

David J. Kappos
*Director of the United States Patent and Trademark Office*

CERTIFICATE OF CORRECTION (continued)

U.S. Pat. No. 7,848,896 B2

Line 53, "$0.455\lambda \leqq m \leqq 0.677\lambda$" should read --$0.455\ \lambda \leq m \leq 0.677\ \lambda$--.

Line 55, "$0.575\lambda \leqq m \leqq 0.859\lambda$" should read --$0.575\ \lambda \leq m \leq 0.859\ \lambda$--.

Line 57, "$0.694\lambda \leqq m \leqq 1.039\lambda$" should read --$0.694\ \lambda \leq m \leq 1.039\ \lambda$--.